(12) United States Patent
Han et al.

(10) Patent No.: US 12,237,547 B2
(45) Date of Patent: Feb. 25, 2025

(54) BATTERY MODULE AND BATTERY PACK INCLUDING THE SAME

(71) Applicant: SK ON CO., LTD., Seoul (KR)

(72) Inventors: Jeong Woo Han, Daejeon (KR); Hae Ryong Jeon, Daejeon (KR)

(73) Assignee: SK ON CO., LTD., Seoul (KR)

( * ) Notice: Subject to any disclaimer, the term of this patent is extended or adjusted under 35 U.S.C. 154(b) by 80 days.

(21) Appl. No.: 18/083,773

(22) Filed: Dec. 19, 2022

(65) Prior Publication Data

US 2023/0216161 A1 Jul. 6, 2023

(30) Foreign Application Priority Data

Dec. 30, 2021 (KR) ........................ 10-2021-0192793

(51) Int. Cl.
*H01M 50/588* (2021.01)
*H01M 10/658* (2014.01)
(Continued)

(52) U.S. Cl.
CPC ....... *H01M 50/588* (2021.01); *H01M 10/658* (2015.04); *H01M 50/211* (2021.01); *H01M 50/507* (2021.01); *H01M 50/516* (2021.01)

(58) Field of Classification Search
CPC ............. H01M 50/588; H01M 10/658; H01M 50/211; H01M 50/507; H01M 50/516; H01M 2220/30; H01M 50/24; H01M 50/291; H01M 50/224; H01M 10/647; H01M 50/503; H01M 50/557; H01M 50/591; H01M 50/258; H01M 50/593; H01M 10/0463; H01M 10/058;
(Continued)

(56) References Cited

U.S. PATENT DOCUMENTS

2016/0172652 A1* 6/2016 Ichikawa ............ H01M 50/516
429/121
2020/0014005 A1* 1/2020 Lee ........................ F16M 11/22
(Continued)

FOREIGN PATENT DOCUMENTS

CN 113067108 * 7/2021
KR 20180099438 A 9/2018
(Continued)

OTHER PUBLICATIONS

Prior Art Search Report of Request for Accelerated Examination submitted for the Korean Patent Application No. 10-2021-0192793 issued by the Korean Intellectual Property Office.
(Continued)

*Primary Examiner* — Lisa S Park
(74) *Attorney, Agent, or Firm* — IP & T GROUP LLP

(57) ABSTRACT

A battery module includes a housing having an internal space; a cell stack accommodated in the internal space and including a plurality of battery cells and a plurality of heat blocking members stacked therein; a busbar assembly including a busbar frame opposing at least one side surface of the cell stack, and a plurality of busbars coupled to the busbar frame and electrically connected to the plurality of battery cells, wherein at least one of the plurality of heat blocking members includes an extension portion inserted into the busbar frame and preventing an electrical short circuit between the plurality of busbars.

20 Claims, 12 Drawing Sheets

(51) Int. Cl.
*H01M 50/211* (2021.01)
*H01M 50/507* (2021.01)
*H01M 50/516* (2021.01)

(58) Field of Classification Search
CPC ............ H01M 50/204; H01M 50/474; H01M 50/533; H01M 2220/10; H01M 2220/20; Y02E 60/10
See application file for complete search history.

(56) References Cited

U.S. PATENT DOCUMENTS

| | | | |
|---|---|---|---|
| 2021/0184303 A1* | 6/2021 | Lee | H01M 50/276 |
| 2021/0320374 A1* | 10/2021 | Lee | H01M 10/6566 |
| 2022/0069377 A1 | 3/2022 | Rhee et al. | |
| 2022/0115737 A1 | 4/2022 | Shin et al. | |
| 2022/0123438 A1 | 4/2022 | Kim et al. | |
| 2023/0178824 A1 | 6/2023 | Hong et al. | |

FOREIGN PATENT DOCUMENTS

| | | |
|---|---|---|
| KR | 102055424 B1 | 12/2019 |
| KR | 10-2020-0107213 A | 9/2020 |
| KR | 20210004189 A | 1/2021 |
| KR | 20210015547 A | 2/2021 |
| KR | 20210077416 A | 6/2021 |
| KR | 10-2284449 B1 | 8/2021 |
| KR | 20220023191 A | 3/2022 |
| KR | 20220029941 A | 3/2022 |

OTHER PUBLICATIONS

Office Action for the Korean Patent Application No. 10-2021-0192793 issued by the Korean Intellectual Property Office on Oct. 16, 2023.

* cited by examiner

BATTERY MODULE AND BATTERY PACK INCLUDING THE SAME

CROSS-REFERENCE TO RELATED APPLICATION(S)

This application claims benefit of priority to Korean Patent Application No. 10-2021-0192793 filed on Dec. 30, 2021 in the Korean Intellectual Property Office, the disclosure of which is incorporated herein by reference in its entirety.

BACKGROUND

1. Field

The present disclosure relates to a battery module and a battery pack including the same.

2. Description of Related Art

As technological development and demand for a mobile device, an electric vehicle, and energy storage systems (ESS) increase, demand for a secondary battery as an energy source has been rapidly increased. A secondary battery may be repeatedly charged and discharged because mutual conversion between chemical energy and electrical energy is reversible, and the types of a secondary battery currently widely used may include a lithium ion battery, a lithium polymer battery, a nickel cadmium battery, a nickel hydrogen battery, and a nickel zinc battery.

When an output voltage and energy capacity higher than those of a single unit secondary battery cell (a battery cell) is necessary, a battery module or a battery pack may be configured by connecting a plurality of unit secondary battery cells to each other. For example, a battery module or a battery pack may refer to a device in which a plurality of unit secondary battery cells are connected in series or in parallel and which may store or output electrical energy.

In such a battery module or battery pack, an electrical connection between one battery cell and another battery cell may be made through a plurality of conductive busbars electrically connected to each battery cell. The plurality of busbars may be disposed in a battery module with a predetermined distance (e.g., a safety distance) therebetween, such that a current does not pass therebetween or a short circuit does not occur. A busbar frame may include a non-conductive material (e.g., plastic) having a predetermined degree of rigidity, and may structurally support a plurality of busbars. The plurality of busbars may be fixed to the busbar frame, such that a safe distance between the busbars may be maintained even while an external impact or vibration is applied.

When a problem such as a short circuit occurs in a portion of battery cells in the battery module and the temperature of the battery cell exceeds a critical temperature, a thermal runaway phenomenon may occur. When a high-temperature or high-pressure gas or flame is generated in the battery module due to such a thermal runaway phenomenon, a busbar frame, which is relatively vulnerable to heat, may collapse and a safety distance between the busbars may not be maintained.

Also, as the busbar frame collapses and may no longer support the busbars, the distance between the busbars may become shorter than the safe distance, such that an electrical short may occur between the busbars, and there may be a risk of rapid heat spreading to adjacent battery cells, which may lead to an accident such as chain ignition or an explosion of the battery cells.

When disposing a plurality of battery cells in a battery module, an insulating pad (or an insulating sheet) may be provided between the battery cells to slow the heat transfer to other battery cells down, even when thermal runaway occurs in a portion of battery cells. However, even when the heat transfer between the battery cells is delayed with the insulating pad, an electrical short circuit between the busbars may not be prevented, which may be problematic.

SUMMARY

An aspect of the present disclosure is to provide a battery module and a battery pack which may prevent electrical shorts between busbars even when thermal runaway occurs in a portion of battery cells.

An aspect of the present disclosure is to provide a battery module which may maintain a distance between busbars even when a busbar frame collapses due to high temperature or high pressure gas or flame in the battery module.

An aspect of the present disclosure is to provide a battery module which may prevent an electrical short between busbars using a heat blocking member, at least a portion of which is inserted into a busbar frame.

An aspect of the present disclosure is to provide a battery module which may maintain a distance between busbars using a heat blocking member including a material having a melting point higher than that of a busbar frame.

According to an aspect of the present disclosure, a battery module includes a housing having an internal space; a cell stack accommodated in the internal space and including a plurality of battery cells and a plurality of heat blocking members stacked therein; a busbar assembly including a busbar frame facing at least one side surface of the cell stack, and a plurality of busbars coupled to the busbar frame and electrically connected to the plurality of battery cells, wherein at least one of the plurality of heat blocking members includes an extension portion inserted into the busbar frame to electrically isolate the plurality of busbars from each other.

The extension portion of the heat blocking member may include a material having a melting point higher than a melting point of a material that constitutes at least part of the busbar frame.

A material of the extension portion may include mica, ceramic wool, aerogel, or a combination of two or more of mica, ceramic wool, and aerogel.

The extension portion may be disposed between two busbars adjacent to each other among the plurality of busbars.

The end of the extension portion may protrude in a direction toward the housing.

One surface of the busbar frame may be disposed to oppose the cell stack, and the plurality of busbars may be disposed on the other surface opposite to the one surface of the busbar frame.

The busbar frame may include an insertion hole penetrating from the one surface to the other surface, and the extension portions may be inserted into the insertion holes and may penetrate through the busbar frame.

At least one of the plurality of battery cells may include a cell body portion including an electrode assembly and a pouch surrounding the electrode assembly; and a plurality of lead tabs connected to the electrode assembly and exposed externally of the pouch.

The heat blocking member may include a heat blocking body portion disposed to oppose the cell body portion in a first direction; and the extension portion extending from the heat blocking body portion in a second direction perpendicular to the first direction, and a length of the extension portion in a third direction perpendicular to both the first direction and the second direction may be equal to or smaller than a length of the heat blocking body portion in the third direction.

A length of the heat blocking body portion in the second direction and a length in the third direction may be equal to or greater than a length of the cell body portion in the second direction and a length in the third direction, respectively.

The housing may include a lower plate on which the cell stack is seated, and the plurality of battery cells and the plurality of heat blocking members included in the cell stack may be stacked in a first direction perpendicular to the lower plate.

The busbar frame may include a first busbar frame and a second busbar frame disposed on both sides of the cell stack, respectively, and the plurality of heat blocking members may include one or more first heat blocking members having an extension portion inserted into the first busbar frame and one or more second heat blocking members having an extension portion inserted into the second busbar frame.

The extension portion of the one or more first heat blocking members and the extension portion of the one or more second heat blocking members may extend in opposite directions.

The one or more first heat blocking members and the one or more second heat blocking members may be disposed to oppose each other with one or more of the plurality of battery cells interposed therebetween, and may be alternately disposed in a stacking direction of the cell stack.

The busbar frame may include a first busbar frame and a second busbar frame disposed on both sides of the cell stack, respectively, and at least one of the plurality of heat blocking members may include a first extension portion inserted into the first busbar frame and a second extension portion inserted into the second busbar frame.

The first extension portion may be disposed between two busbars adjacent to each other among a plurality of busbars coupled to the first busbar frame, and the second extension portion may penetrate through one of the plurality of busbars coupled to the second busbar frame.

The busbar frame may further include a cap surrounding an end of the extension portion.

At least one of the plurality of battery cells may include a lead tab electrically connected to at least one of the plurality of busbars.

At least a portion of the lead tab may be bent to oppose a surface of at least one of the plurality of busbars.

According to an aspect of the present disclosure, a battery module includes a housing having an internal space; one or more cell stacks accommodated in the internal space, and including a plurality of battery cells and a plurality of heat blocking members stacked therein in a first direction; and a plurality of busbars electrically connected to at least a portion of the plurality of battery cells, wherein the plurality of busbars include a first busbar disposed to oppose the cell stack in a second direction perpendicular to the first direction; and a second busbar spaced apart from the first busbar in the first direction, and wherein at least one of the plurality of heat blocking members includes an extension portion extending in the second direction and disposed between the first busbar and the second busbar.

An end of the extension may further protrude in the second direction than the first busbar and the second busbar.

The one or more cell stacks may include a first cell stack and a second cell stack arranged side by side in a third direction perpendicular to both the first direction and the second direction.

The housing may include a barrier wall disposed between the first cell stack and the second cell stack and partitioning the internal space.

The cell stack may further include a compression pad opposing at least one of the plurality of battery cells.

An insulating cover disposed between the busbar and the housing to prevent a short circuit between the busbar and the housing may be further included.

A battery pack including a plurality of battery modules may be provided.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
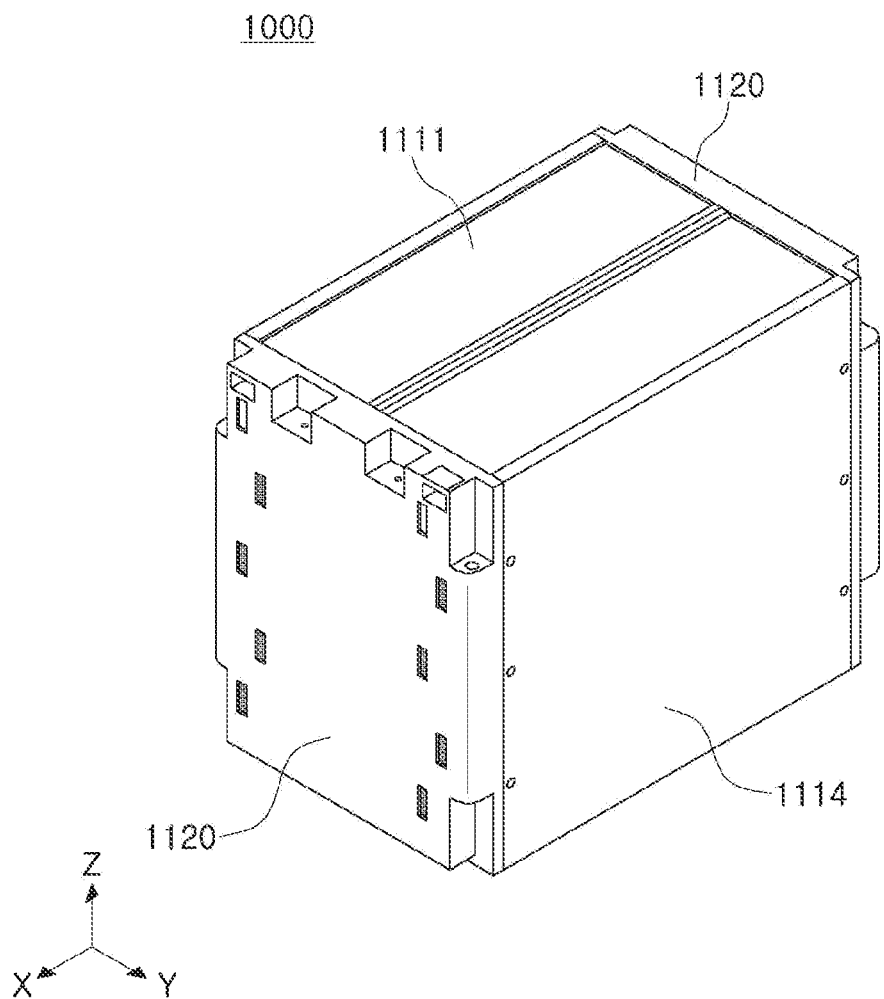
FIG. 1 is a perspective diagram illustrating a battery module according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description.

An expression used in the singular encompasses the expression of the plural, unless it has a clearly different meaning in context, and elements having the same function within the scope of the same concept represented in the drawing of each example embodiment will be described using the same reference numeral.

Also, in the example embodiments, expressions such as "upper side," upper portion, lower side, lower portion, side surface, front surface, rear surface, and the like, are based on the directions illustrated in the drawings, and may be represented differently when the direction of the corresponding object changes.

The terms including ordinal numbers such as "first," "second," and so on may be used in the description and the claims to distinguish the elements from one another. These terms are used only for the purpose of differentiating one component from another, without limitation thereto.

Figure 2:
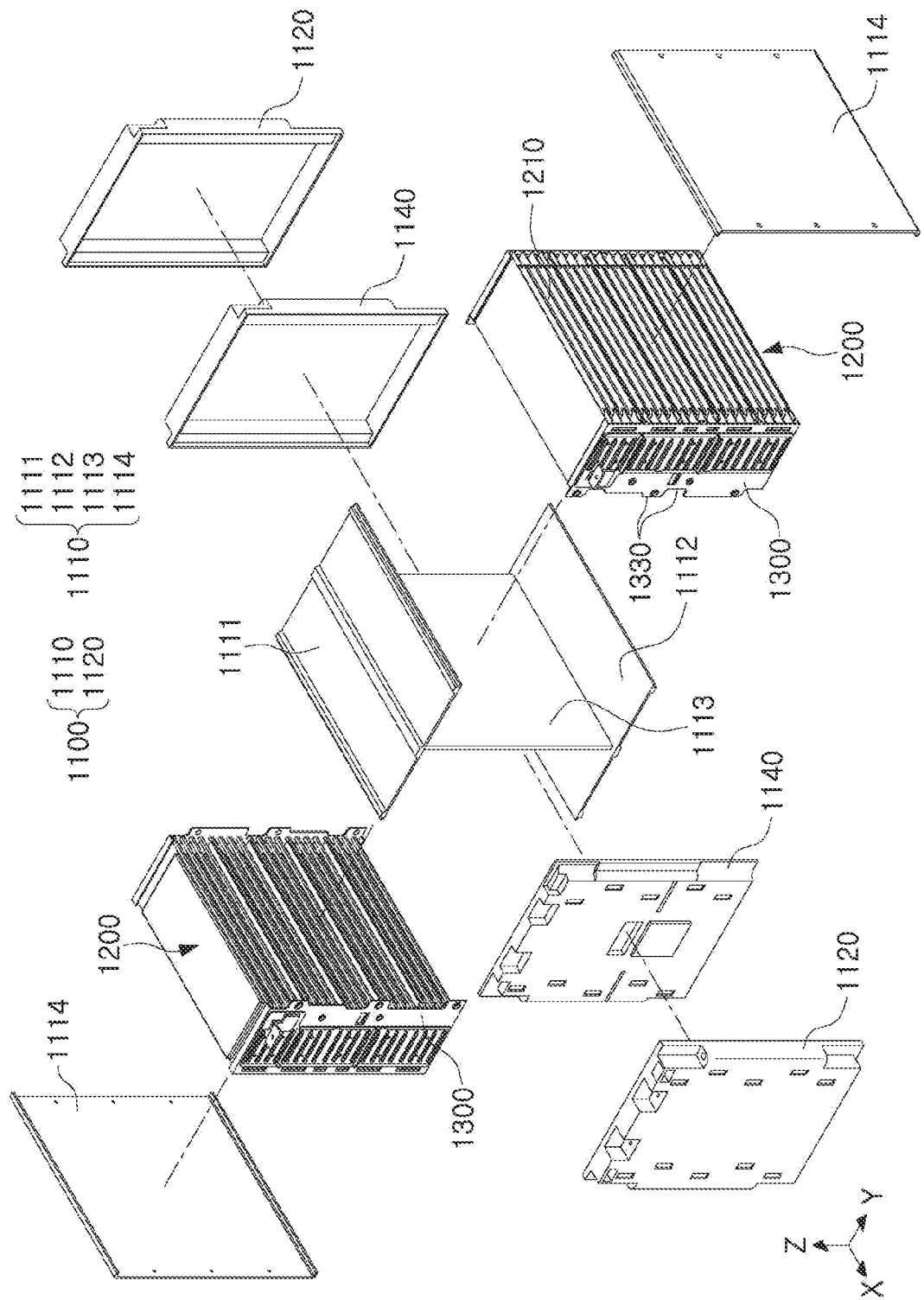
FIG. 2 is an exploded perspective diagram illustrating a battery module according to an example embodiment of the present disclosure.

FIG. 1 is a perspective diagram illustrating a battery module 1000. FIG. 2 is an exploded perspective diagram illustrating a battery module 1000.

The battery module 1000 may include a cell stack 1200 including a plurality of battery cells 1210, a busbar assembly 1300 electrically connected to the cell stack 1200, a housing 1100 in which the cell stack 1200 is accommodated, and an insulating cover 1140 disposed between the housing 1100 and the cell stack 1200.

The housing 1100 may include a module frame 1110 forming an internal space in which the cell stack 1200 is accommodated, and an end plate 1120 coupled to the module frame 1110. For example, as illustrated in FIG. 2, the housing 1100 may include a module frame 1110 including an upper plate 1111, a lower plate 1112, and a pair of side plates 1114, and a pair of end plates 1120 for closing open both ends of the module frame 1110.

The housing 1100 may be formed of a material having a predetermined rigidity to protect the cell stack 1200 and other electrical devices from external impact. For example, the housing 1100 may include a metal material such as aluminum.

One or more cell stacks 1200 may be accommodated in the internal space of the housing 1100. For example, as illustrated in FIG. 2, a plurality of cell stacks 1200 may be accommodated in the internal space of the housing 1100.

The housing 1100 may further include a barrier wall 1113 disposed between the plurality of cell stacks 1200 and partitioning an internal space. For example, as illustrated in FIG. 2, the housing 1100 may include a barrier wall 1113 connected to at least one of the upper plate 1111 and the lower plate 1112 and partitioning the internal space. The upper plate 1111, the lower plate 1112, and the barrier wall 1113 may be integrated with each other, and accordingly, the module frame 1110 may include an "I"-shaped frame. When the module frame 1110 is provided as an "I"-shaped frame, at least one cell stack 1200 may be disposed on both side surfaces of the barrier wall 1113, respectively. However, the structure of the housing 1100 is not limited to the above example, and any shape having an internal space in which at least one cell stack 1200 may be accommodated may be used. That is, the examples illustrated in FIG. 2 are merely examples, and the module frame 1110 may be provided in various shapes. For example, the module frame 1110 may be configured as a U-shaped frame in which the lower plate 1112 and the side plate 1114 are integrated with each other, or as an integral mono-frame with open front and rear surfaces.

The cell stack 1200 included in the battery module 1000 may be formed by stacking a plurality of battery cells 1210 and a plurality of cell pads. The cell pad may include various types of pads, such as a compressive pad for preventing the battery cell 1210 from swelling, and an insulating pad for blocking thermal runaway transfer between the battery cells 1210 adjacent to each other.

The plurality of battery cells 1210 and the plurality of cell pads may be stacked in various directions and may form the cell stack 1200. For example, as illustrated in FIG. 2, the plurality of battery cells 1210 and the plurality of cell pads may be stacked in a direction perpendicular to the lower plate 1112 of the housing 1100. However, FIG. 2 is merely an example, and the plurality of battery cells 1210 and the plurality of cell pads may be stacked in a direction parallel to the lower plate 1112 of the housing 1100.

The battery module 1000 may include one or more cell stacks 1200. When a plurality of the cell stacks 1200 are provided, the plurality of cell stacks 1200 may be disposed in the housing 1100 in various manners. For example, as illustrated in FIG. 2, the plurality of cell stacks 1200 may be arranged side by side in a direction parallel to the lower plate 1112 of the housing 1100 and may be electrically connected to each other. Alternatively, the plurality of cell stacks 1200 may be arranged side by side in a direction (e.g., the Y-axis direction in FIG. 2) perpendicular to the direction (e.g., the X-axis direction in FIG. 2) in which the battery cells 1210 are stacked.

The plurality of battery cells 1210 included in the cell stack 1200 may be electrically connected to each other by a busbar assembly 1300. When a plurality of cell stacks 1200 are provided, a plurality of busbar assemblies 1300 may also be provided and may be connected to the cell stacks 1200, respectively. For example, as illustrated in FIG. 2, the plurality of cell stacks 1200 may be coupled to each other while being connected to different busbar assemblies 1300, respectively. For assembly accuracy and convenience, the busbar assembly 1300 may include a coupling guide unit 1330 having an uneven shape engaging with another adjacent busbar assembly 1300. However, FIG. 2 is merely an example, and the plurality of cell stacks 1200 may be connected to the busbar assemblies 1300 integrated with each other, respectively.

Although not illustrated in the drawings, the battery module 1000 may further include a sensing module (not illustrated) connected to the busbar assembly 1300. The sensing module (not illustrated) may include a temperature sensor or a voltage sensor, and may thus detect the state of the battery cell 1210.

The battery module 1000 may include an insulating cover 1140. For example, as illustrated in FIG. 2, an insulating cover 1140 may be disposed between the end plate 1120 and the busbar assembly 1300. The insulating cover 1140 may include an insulating material, thereby preventing an electrical connection between the cell stack 1200 and the housing 1100. For example, the insulating cover 1140 may be formed of a plastic injection molding material. As the insulating cover 1140 is disposed, an electrical short between the cell stack 1200 and the housing 1100 or between the busbar and the housing 1100 may be prevented.

Hereinafter, the cell stack 1200 and the busbar assembly 1300 included in the battery module 1000 will be described in greater detail with reference to FIGS. 3 to 4.

Figure 3:
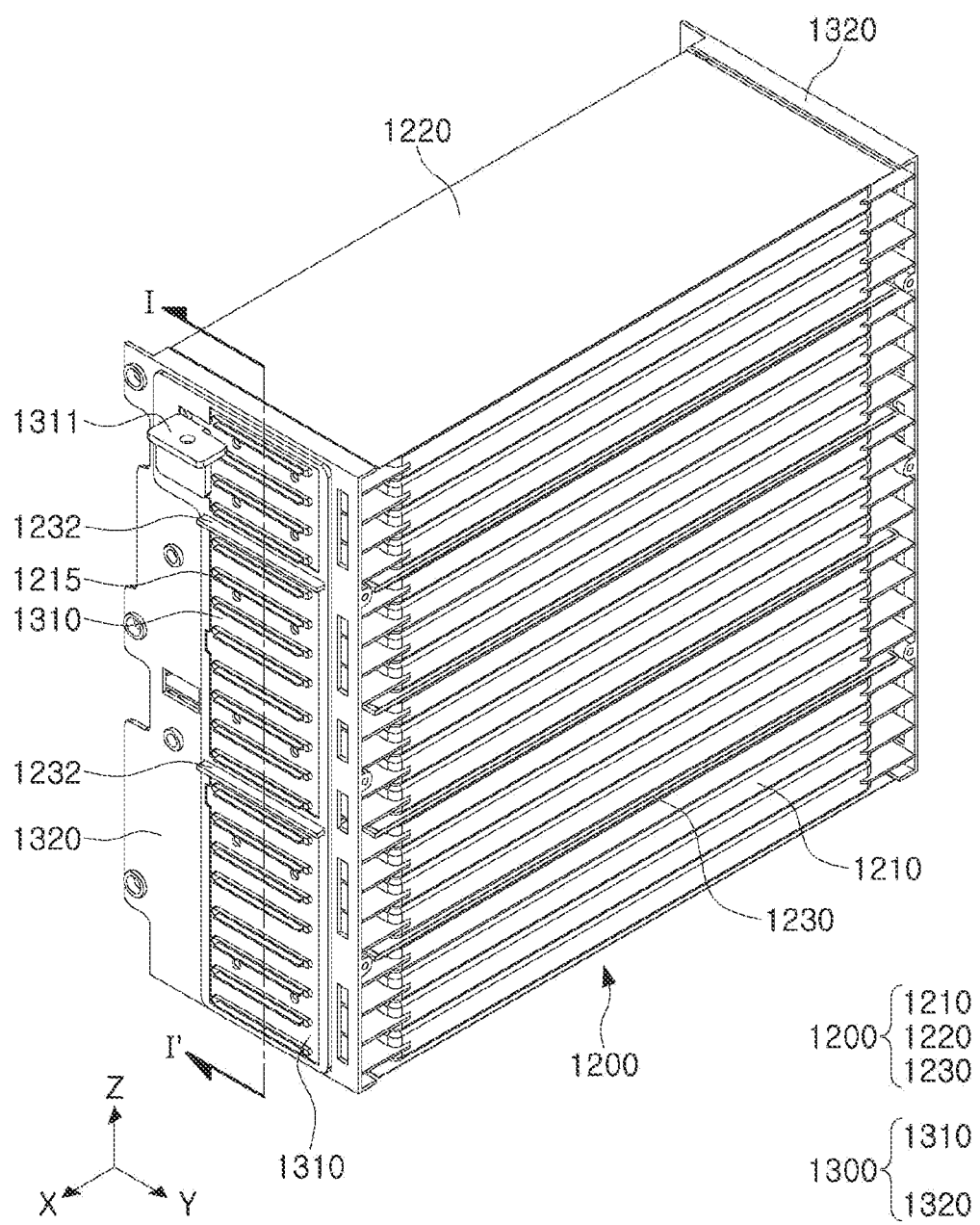
FIG. 3 is a perspective diagram illustrating a cell stack and a busbar assembly according to an example embodiment of the present disclosure.
Figure 4:
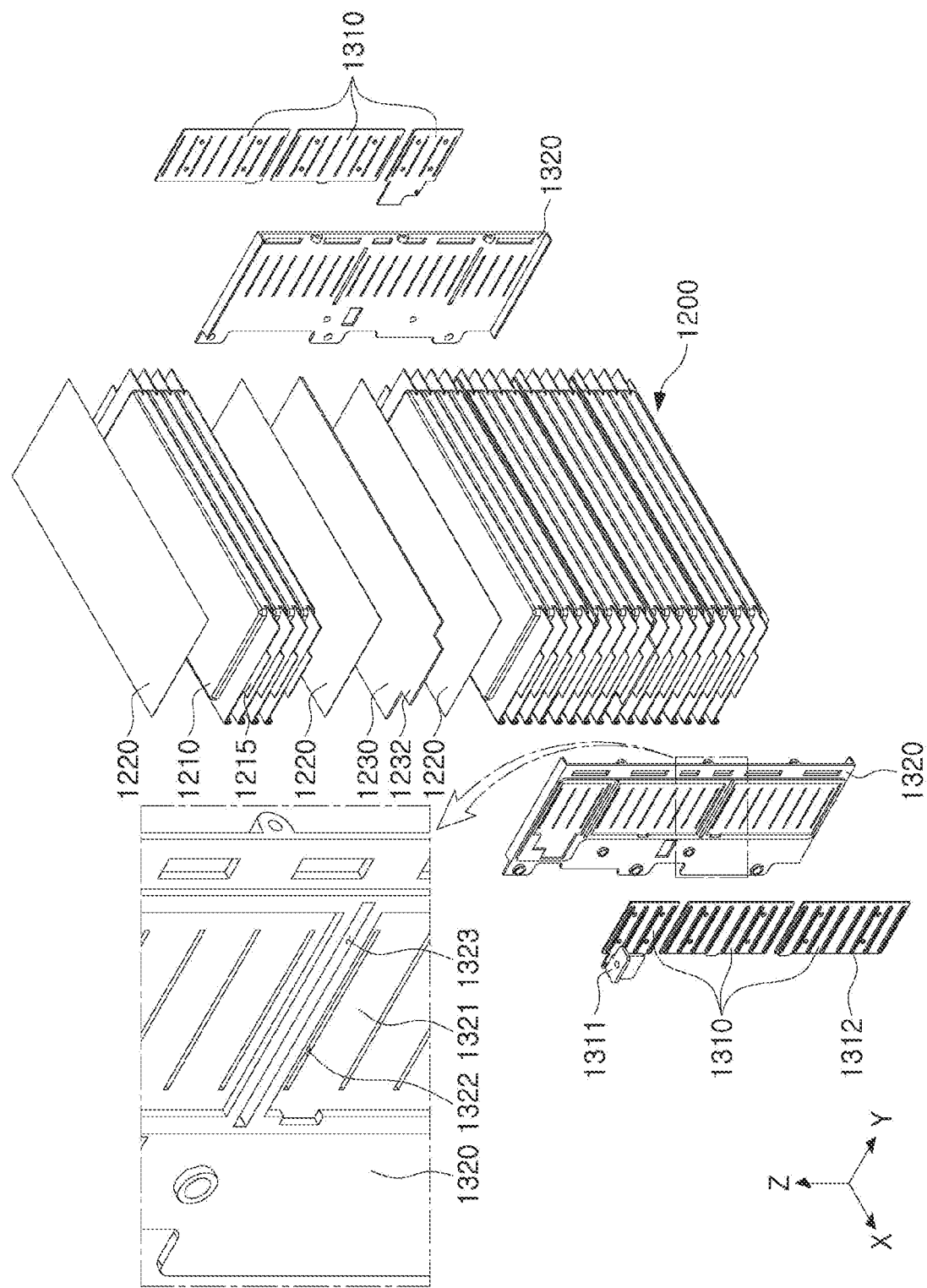
FIG. 4 is an exploded perspective diagram illustrating a cell stack and a busbar assembly according to an example embodiment of the present disclosure.
Figure 5:
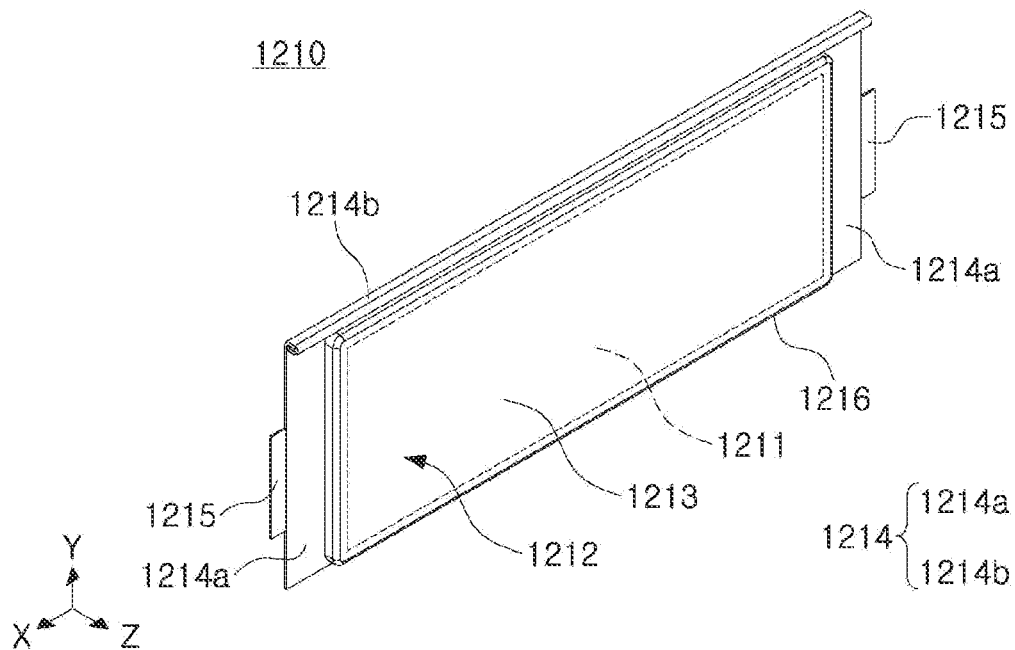
FIG. 5 is a perspective diagram illustrating a battery cell included in a battery module according to an example embodiment of the present disclosure.

FIG. 3 is a perspective diagram illustrating a cell stack 1200 and a busbar assembly 1300 according to an example embodiment, and FIG. 4 is an exploded perspective diagram illustrating a cell stack 1200 and a busbar assembly 1300 according to an example embodiment. FIG. 5 is a perspective diagram illustrating a battery cell 1210 according to an example embodiment. The battery cell 1210, the cell stack 1200, and the busbar assembly 1300 described with reference to FIGS. 3 to 5 may be the same as the battery cell 1210, the cell stack 1200 and the busbar assembly 1300 described above with reference to FIGS. 1 to 2, and overlapping descriptions will not be provided.

The battery module 1000 (in FIGS. 1 and 2) may include one or more cell stacks 1200 in an internal space. The cell stack 1200 may be formed by stacking one or more battery cells 1210 and one or more auxiliary members 1220 and 1230. For example, as illustrated in FIG. 4, the cell stack 1200 may be formed by stacking a plurality of battery cells 1210, a plurality of heat blocking members 1230, and a plurality of compression pads 1220.

The cell stack 1200 may include one or more battery cells 1210. The battery cell 1210 may be configured to convert chemical energy into electrical energy and to supply power to an external circuit, or configured to receive power from an external entity, to convert electrical energy into chemical energy and to store electricity. For example, the battery cell 1210 may include a nickel metal hydride (Ni-MH) battery or a lithium ion (Li-ion) battery for charging and discharging. A plurality of battery cells 1210 may be stacked side by side and connected to each other in series or parallel and may form one cell stack 1200.

The plurality of battery cells 1210 included in the cell stack 1200 may be a pouch-type battery cell 1210 as illustrated in FIG. 5.

Referring to FIG. 5, the pouch-type battery cell 1210 may include a cell body portion 1213 in which the electrode assembly 1211 is accommodated in the pouch 1212, and a plurality of lead tabs 1215 electrically connected to the electrode assembly 1211 and exposed externally of the pouch 1212.

The electrode assembly 1211 may include a plurality of internal electrode plates. Here, the internal electrode plate may include a positive electrode plate (not illustrated) and a negative electrode plate (not illustrated), and the electrode assembly 1211 may have a form in which a positive electrode plate (not illustrated) and a negative electrode plate (not illustrated) are stacked with a separator (not illustrated) interposed therebetween. An internal electrode tab (not illustrated) may be provided on each of the plurality of positive electrode plates (not illustrated) and the plurality of negative electrode plates (not illustrated), and the internal electrode tabs (not illustrated) may be connected to be in contact with each other with the same polarity. The internal electrode tabs (not illustrated) having the same polarity may be electrically connected to each other and may be electrically connected to the outside of the pouch 1212 through the lead tab 1215. As for the battery cell 1210 illustrated in FIG. 5, the two lead tabs 1215 may be disposed to face in opposite directions, but may be disposed in the same direction with different lengths or heights.

The pouch 1212 may surround the electrode assembly 1211, may form the exterior of the cell body portion 1213, and may provide an internal space in which the electrode assembly 1211 and the electrolyte (not illustrated) are accommodated. The pouch 1212 may be provided to accommodate the electrode assembly 1211 therein, and may be provided in a rectangular shape to correspond to the shape of the electrode assembly 1211.

The pouch 1212 may be formed by folding a single sheet of exterior material. For example, the pouch 1212 may be configured in a form in which one sheet of exterior material is folded in half, and an internal space in which the electrode assembly 1211 is accommodated is provided therein. The exterior material may be formed of a material for protecting the electrode assembly from an external environment, and may include, for example, an aluminum laminated film.

A sealing portion 1214 may be formed by bonding an exterior material to an edge of the pouch 1212. A thermal fusion method may be used for bonding the exterior material for forming the sealing portion 1214, but an example embodiment thereof is not limited thereto.

The sealing portion 1214 may include a first sealing portion 1214a formed in a position in which the lead tab 1215 is disposed, and a second sealing portion 1214b formed in a position in which the lead tab 1215 is not disposed. To increase bonding reliability of the sealing portion 1214 and to reduce the area of the sealing portion 1214, a portion of the sealing portion 1214 may be folded at least once. For example, as illustrated in FIG. 5, the second sealing portion 1214b may be folded twice or more and may be fixed by an adhesive member. In this case, an adhesive member may be filled in the second sealing portion 1214b, and the shape of the second sealing portion 1214b folded a plurality of times may be maintained by the adhesive member. The adhesive member may be formed of an adhesive having high thermal conductivity. The adhesive member may be formed of epoxy or silicone, but an example embodiment thereof is not limited thereto.

The sealing portion 1214 may not be formed on the surface on which the pouch 1212 is folded along one edge of the electrode assembly 1211. A portion in which the pouch 1212 is folded along one edge of the electrode assembly 1211 may be defined as a folding portion 1216 to distinguish the portion from the sealing portion 1214. That is, the pouch 1212-type battery cell 1210 may have a three-sided sealing pouch form in which the sealing portion 1214 may be formed on three of the four edge surfaces of the pouch 1212, and the folding portion 1216 may be formed on the remaining surface.

However, the battery cell 1210 is not limited to the three-sided sealing pouch form illustrated in FIG. For example, a pouch may be formed by overlapping two different exterior materials, and a sealing portion may be formed on an entirety of four surfaces of the periphery of the pouch. For example, the sealing portion may include a sealing portion on two surfaces on which the lead tab is disposed, and a sealing portion on the other two surfaces on which the lead tab is not disposed.

In the above description, the example in which the pouch-type battery cell 1210 may be used as the battery cell 1210 has been described, but the battery cell 1210 is not limited to the aforementioned pouch type, and may be implemented as a can-type battery cell. For example, the can-type battery cells may have a rectangular cross-section to be stacked and to form the cell stack 1200. In a can-type battery cell having a rectangular cross-section, each electrode may be disposed on a side surface of the battery cell and connected to the busbar assembly 1300.

Subsequently, the cell stack 1200 and the busbar assembly 1300 will be described with reference to FIGS. 3 and 4.

The cell stack 1200 may further include various types of auxiliary members 1220 and 1230 in addition to the battery cell 1210. For example, as illustrated in FIG. 4, the cell stack 1200 may be formed by stacking a plurality of battery cells 1210, a plurality of compression pads 1220, and a plurality of heat blocking members 1230. However, the cell stack 1200 illustrated in FIG. 4 is merely an example, and the cell stack 1200 may further include other types of members in addition to the compression pad 1220 and the heat blocking member 1230.

A plurality of compression pads 1220 may be stacked together with the battery cell 1210. The compression pad 1220 may be disposed to oppose the battery cell 1210. The compression pad 1220 may be provided to protect the battery cell 1210 from external impact or to absorb expansion pressure according to the expansion of the battery cell 1210. Accordingly, the thickness expansion due to swelling of the battery cell 1210 may be prevented such that changes in the exterior shape of the cell stack 1200 may be reduced, and deterioration of performance of the battery cell 1210 due to the swelling may be prevented. To this end, the compression pad 1220 may include a material for absorbing the expansion pressure of the battery cell 1210, such as, for example, a polyurethane-based material.

A plurality of heat blocking members 1230 may be stacked together with the battery cell 1210. The heat blocking member 1230 may be disposed to oppose at least one of the battery cell 1210 and the compression pad 1220. The heat blocking member 1230 may prevent a flame or high-temperature thermal energy from spreading between the battery cells 1210 adjacent to each other, thereby preventing chain ignition in the cell stack 1200. To this end, the heat blocking member 1230 may include a material having at least one of flame retardancy, heat resistance, heat insulation, and insulation properties. Here, heat resistance may refer to the properties in which a material does not melt and a shape thereof does not change even at a temperature of 600 degrees Celsius or higher, and thermal insulation may refer to the properties in which a thermal conductivity is 1.0 W/mK or less. For example, the heat blocking member 1230 may be formed of at least a portion of mica, silicate, graphite, alumina, ceramic wool, or aerogel for performing a function of preventing heat and/or flame spreading. However, the material of the heat blocking member 1230 is not limited thereto, and any material which may maintain shape of the battery cell 1210 during thermal runaway and may prevent spreading of heat or flame to the adjacent battery cells 1210 may be used.

The heat blocking member 1230 may have the form of a plate-shaped sheet or plate-shaped pad to be stacked side by side with the battery cell 1210. However, the shape of the heat blocking member 1230 is not limited thereto, and any shape which may prevent heat from spreading between the battery cells 1210 adjacent to each other with the heat blocking member 1230 interposed therebetween may be used.

A plurality of compression pads 1220 or a plurality of heat blocking members 1230 may be provided in the cell stack 1200, and may be disposed between the battery cells 1210 adjacent to each other or on the edge of the cell stack 1200. However, the position of the compression pad 1220 or the heat blocking member 1230 is not limited to the above-mentioned example, and may be appropriately disposed in the battery module if desired.

Meanwhile, in the cell stack 1200 illustrated in FIG. 4, the compression pad 1220, the four battery cells 1210, the compression pad 1220, and the heat blocking member 1230 may be stacked in that order. However, the order of stacking the components (the battery cell and the various pads) included in the cell stack 1200 may be varied, and is not limited to the illustrated examples.

A plurality of battery cells 1210 included in the cell stack 1200 may be electrically connected to each other by a busbar assembly 1300. The busbar assembly 1300 may include a busbar frame 1320 disposed to oppose the cell stack 1200 and a plurality of busbars 1310 disposed to be electrically connected to at least a portion of the plurality of battery cells 1210.

The busbar may be formed of a conductive material, and may electrically connect the plurality of battery cells 1210 to each other. The busbar frame 1320 may support the busbar 1310 to be stably connected to the battery cell 1210. That is, the busbar 1310 may be electrically connected to the battery cell 1210 while being fixed to the busbar frame 1320. For example, as illustrated in FIG. 3 or FIG. 4, one side of the busbar frame 1320 may be disposed to cover the cell stack 1200, and the plurality of busbars 1310 may be fixed to the other surface of the busbar frame 1320 while being electrically connected to the battery cell 1210.

The busbar frame 1320 may be provided to structurally fix the busbar 1310 while an external impact or vibration is applied. For example, the busbar frame 1320 may include a light plastic material having excellent mechanical strength, such as polybutylene terephthalate (PBT) and modified polyphenylene oxide (MPPO), and accordingly, the busbar frame 1320 may secure insulation and may structurally support the busbar 1310.

A plurality of the bus bars 1310 may be provided and arranged side by side in the stacking direction of the battery cells 1210. For example, as illustrated in FIG. 4, the plurality of busbars 1310 may be disposed side by side on the seating portion 1321 provided in the busbar frame 1320 in the stacking direction of the battery cells 1210 with a predetermined distance therebetween. The busbar frame 1320 may structurally support the busbar 1310 and may maintain a predetermined distance. Since the busbar frame 1320 is formed of an insulating material, the plurality of busbars 1310 fixed with a predetermined distance therebetween may be electrically separated from each other.

The busbar 1310 may be coupled to the busbar frame 1320 in various manners. For example, the busbar 1310 may be fixed to the busbar frame 1320 by a thermal fusion process or an insert injection process.

The lead tab 1215 of the battery cell 1210 may be inserted into a slit hole 1312 of the busbar 1310 and may be electrically connected to the busbar 1310. For example, at least a portion of the lead tab 1215 of the battery cell 1210 may be inserted into the slit hole 1312 of the busbar 1310. The lead tab 1215 may be bonded while being inserted into the slit hole 1312 by a process such as laser welding, and the busbar 1310 and the battery cell 1210 may be electrically connected to each other through the lead tab. In this case, a slit hole 1322 (hereinafter, referred to as a second slit hole) may also be provided in the busbar frame 1320 in a position corresponding to the slit hole 1312 (hereinafter, referred to as a first slit hole) of the busbar 1310. Accordingly, the lead tab 1215 of the battery cell 1210 may penetrate through both the first slit hole 1312 and the second slit hole 1322 and may be connected to the busbar 1310 assembly 1300.

A portion of the plurality of busbars 1310 may include a connection terminal 1311 used for electrical connection with an external entity, and the connection terminal 1311 may be exposed externally of a housing 1100 (in FIG. 2) to be electrically connected to an external device.

When thermal runaway occurs in the battery cells 1210 included in the cell stack 1200, high-temperature thermal energy, gas, or flames may be generated in the cell stack 1200. Accordingly, the busbar assembly 1300 adjacent to the cell stack 1200 may also be exposed to a high temperature environment. When the internal temperature of the busbar assembly 1300 rises above a certain level, the material forming the busbar assembly 1300 may be deformed. For example, when the busbar frame 1320 includes a material deformed at a high temperature of 200 degrees Celsius or more and the battery cell 1210 ignites, the busbar frame 1320 may melt and may no longer structurally support the busbar 1310. In this case, two busbars adjacent to each other 1310 may come into be in contact with each other such that an electrical short may occur, which may cause a chain ignition of the cell stack 1200. In particular, when the busbars 1310 are arranged side by side in the direction of gravity (e.g., the Z-axis direction in FIG. 4) in the battery module, the busbars 1310 may move in the direction (e.g., in the Z-axis direction in FIG. 4) of gravity according to the collapse of the busbar frame 1320, and the risk of a short circuit between the busbars 1310 may increase. To prevent this, the heat blocking member 1230 may further include an extension portion 1232 for preventing a short circuit between the busbars 1310 even in a high-temperature environment such as thermal runaway.

The extension portion 1232 included in the heat blocking member 1230 may extend in a direction parallel to the lead tab 1215 of the battery cell 1210. For example, when the stacking direction of the battery cells 1210 included in the cell stack 1200 is defined as the first direction (e.g., the Z-axis direction in FIG. 4), the lead tab of the battery cell 1210 may extend in the second direction (e.g., the X-axis direction in FIG. 4) different from the first direction (the Z-axis direction in FIG. 4), and the extension portion 1232 of the heat blocking member 1230 may also be extended in the second direction (the X-axis direction in FIG. 4). In this case, the first direction and the second direction may intersect each other. (In the description below, the stacking direction of the battery cells 1210 included in the cell stack 1200 may be defined as the first direction, and the direction in which the cell stack 1200 and the busbar 1310 face each other may be defined the second direction, and a direction intersecting with both the first direction and the second direction may be defined as the third direction.)

The extension portion 1232 may be disposed between busbars 1310 adjacent to each other. For example, as illustrated in FIG. 3, two busbars 1310 may be spaced apart from each other with a predetermined distance therebetween on the busbar frame 1320, and an extension portion 1232 of a heat blocking member 1230 may be disposed therebetween. Accordingly, two busbars adjacent to each other 1310 may be arranged side by side on the busbar frame 1320 with the extension portion 1232 interposed therebetween.

The extension portion 1232 may further protrude toward the housing 1100 (in FIG. 2) than the busbar 1310. For example, when the extension portion 1232 of the heat blocking member 1230 extends from the heat blocking body portion 1231 (in FIG. 6) of the heat blocking member 1230 in the second direction (e.g., the X-axis direction in FIG. 4), the end of the extension portion 1232 may protrude further in the second direction (the X-axis direction in FIG. 4) than the busbar 1310.

To dispose the extension portion 1232 between the busbars 1310 adjacent to each other, the extension portion 1232 may be inserted into the busbar frame 1320. For example, the extension portion 1232 of the heat blocking member 1230 may penetrate through an insertion hole 1323 formed by penetrating from one surface to the other surface of the busbar frame 1320 and may be disposed between the busbars 1310 adjacent to each other. In this case, the extension portion 1232 of the heat blocking member 1230 may penetrate through the busbar frame 1320 and may be disposed between the busbars 1310 disposed on the other surface of the busbar frame 1320.

The insertion hole 1323 of the busbar frame 1320 through which the extension portion 1232 of the heat blocking member 1230 penetrates may be disposed between the seating portions 1321 on which the busbar 1310 is seated. That is, the extension portion 1232 may be provided to avoid the busbar 1310 and to be inserted into the busbar frame 1320. However, the position of the insertion hole 1323 is not limited thereto, and, for example, the insertion hole 1323 may be formed in the seating portion 1321 on which the busbar 1310 is seated. In this case, the extension portion 1232 may be inserted into both the busbar 1310 and the busbar frame 1320, which will be described later with reference to FIG. 10.

Referring to FIGS. 3 to 5, the extension portion 1232 of the heat blocking member 1230 may be configured such that the shape thereof may not be deformed even during thermal runaway of the battery cell 1210. For example, the extension portion 1232 of the heat blocking member 1230 may include a material which does not melt even at a temperature of 600 degrees Celsius or higher, similarly to the other portions of the heat blocking member 1230, such that the shape thereof may not change, even in a high temperature environment, and may be disposed between the busbars 1310.

That is, the extension portion 1232 of the heat blocking member 1230 may include at least a portion of a material of mica, silicate, graphite, alumina, ceramic wool, or aerogel. However, the material of the extension portion 1232 is not limited thereto, and any material which may maintain the shape thereof during thermal runaway of the battery cell 1210 and may maintain the state of being inserted into the busbar frame 1320 may be used.

Accordingly, even when the busbar frame 1320 supporting the busbar 1310 is deformed by the thermal runaway of the battery cell 1210, the extension portion 1232 of the heat blocking member 1230 may prevent the busbars 1310 from being in contact with each other. That is, the heat blocking member 1230 may prevent an electrical short between the busbars 1310 during thermal runaway such that the battery module may maintain a stable structure electrically.

The stacking direction of the battery cells 1210 and the heat blocking member 1230 included in the cell stack 1200 may be parallel to the direction of gravity. For example, the stacking direction of the cell stack 1200 in FIG. 3 may be a direction of gravity. Even when the busbar frame 1320 is thermally deformed due to a fire in the battery module, the extension portion 1232 of the heat blocking member 1230 may prevent the busbar 1310 from moving down in the direction of gravity and being in contact with each other.

Hereinafter, the heat blocking member 1230 including the extension portion 1232 will be described with reference to FIGS. 6 to 8.

Figure 6:
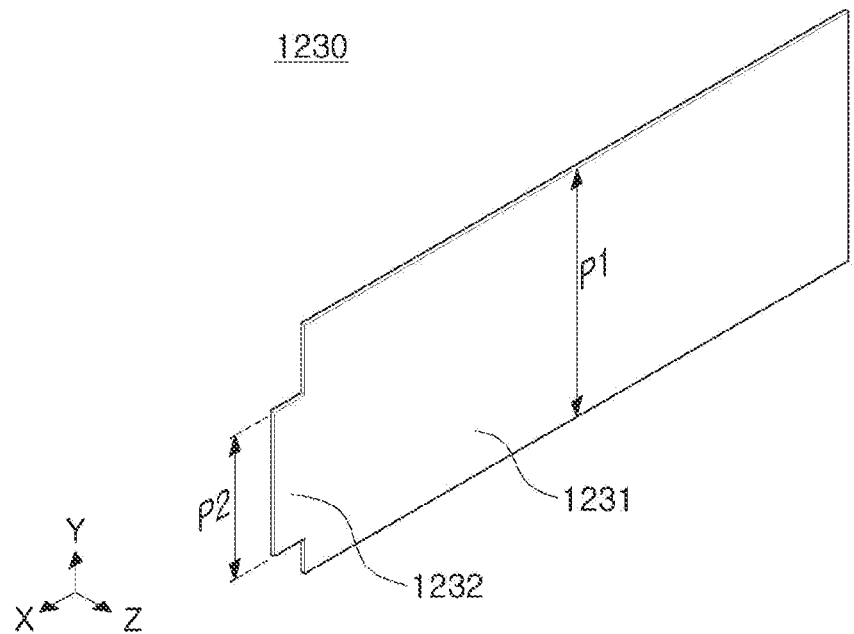
FIG. 6 is a plan diagram illustrating a heat blocking member including an extension portion according to an example embodiment of the present disclosure.
Figure 7:
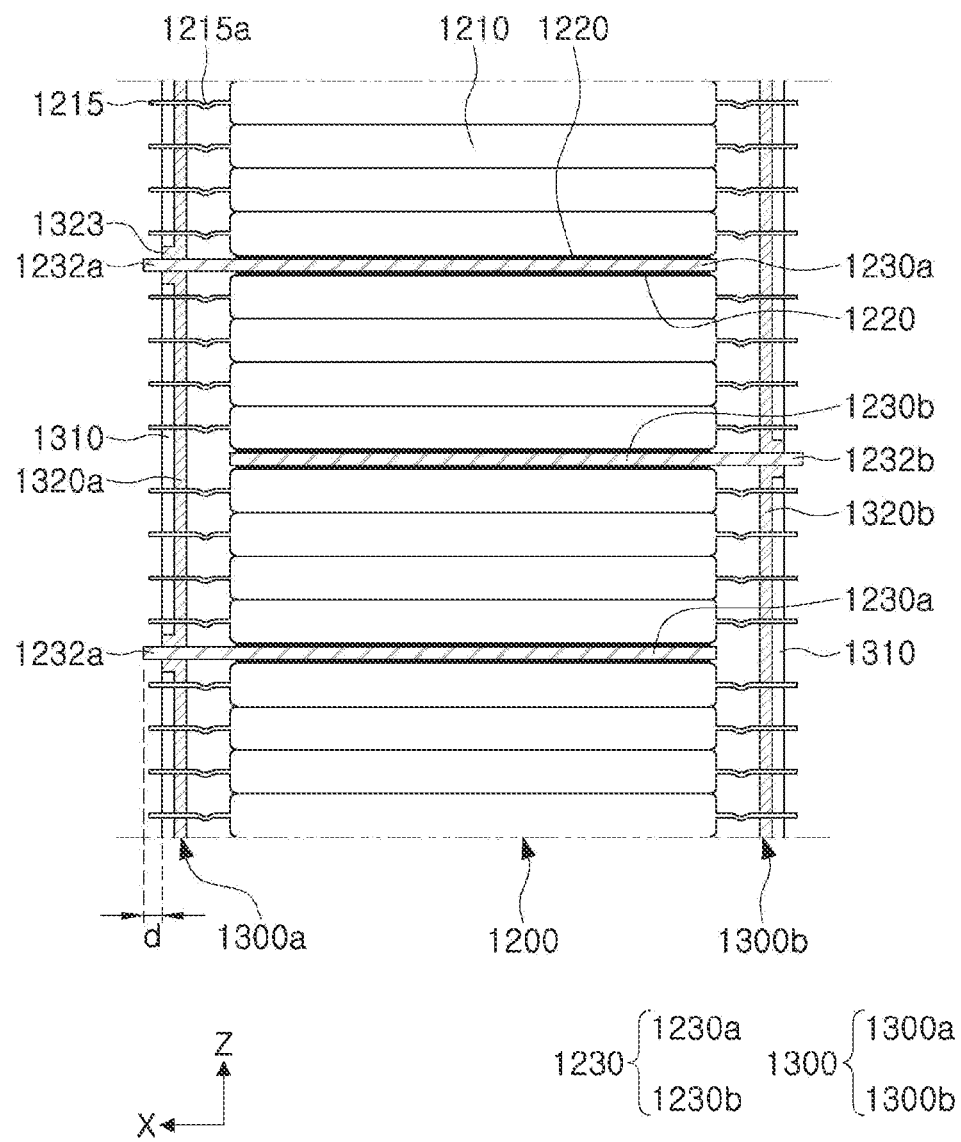
FIG. 7 is a cross-sectional diagram taken along line I-I' in FIG. 3, illustrating a disposition of a heat blocking member according to an example embodiment of the present disclosure.
Figure 8:
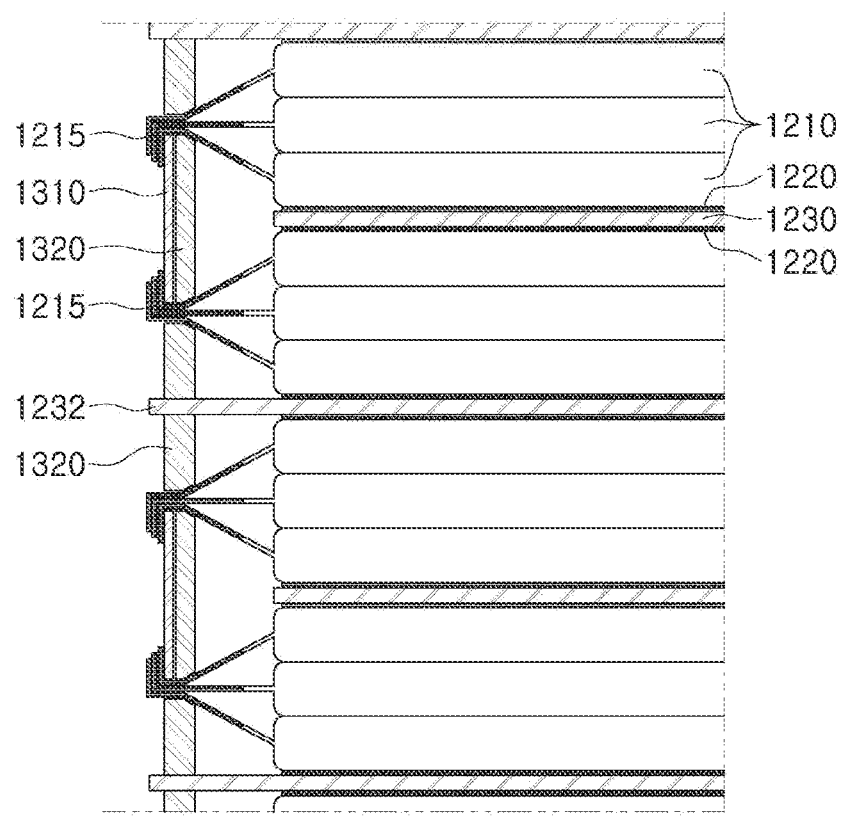
FIG. 8 is a cross-sectional diagram illustrating the example of connecting a lead tab of a battery cell according to an example embodiment of the present disclosure.

FIG. 6 is a plan diagram illustrating a heat blocking member 1230 including an extension portion 1232 according to an example embodiment, and FIG. 7 is a cross-sectional diagram taken along line I-I' in FIG. 3, illustrating a disposition of a heat blocking member 1230 according to an example embodiment. FIG. 8 is a cross-sectional diagram illustrating the example of connecting a lead tab 1215 of a battery cell 1210 according to an example embodiment. The battery cell 1210, the compression pad 1220, the heat blocking member 1230, and the battery module including the same described with reference to FIGS. 6 to 8 may be the same as the battery cell 1210 and the compression pad 1220, the heat blocking member 1230 and the battery module 1000 including the same, and thus, overlapping descriptions will not be provided.

The heat blocking member 1230 may include a heat blocking body portion 1231 disposed to oppose the battery cell 1210 and an extension portion 1232 extending from the heat blocking body portion 1231.

The heat blocking member 1230 may be disposed between the stacked battery cells 1210 and may block heat spreading between the battery cells 1210. To effectively block heat spreading, the heat blocking member 1230 may cover the cell body portion 1213 (in FIG. 5) which may be a region of the battery cell 1210 in which an electrode assembly 1211 (in FIG. 5) is provided. For example, the heat blocking body portion 1231 of the heat blocking member 1230 may be provided in a shape corresponding to the cell body portion 1213 (in FIG. 5) of the battery cell 1210, and may be configured to have a size larger than that of the cell body portion 1213 (in FIG. 5). That is, the length of the heat blocking body portion 1231 in the second direction (X-axis direction in FIG. 6) and the third direction (Y-axis direction in FIG. 6) may be equal to or greater than the lengths of the cell body portion 1213 (in FIG. 5) in the second direction (the X-axis direction in FIG. 5) and the length in the third direction (the Y-axis direction in FIG. 5). Accordingly, the heat blocking member 1230 may cover an entirety of the cell body portions 1213 (in FIG. 5) opposing the heat blocking member 1230 and may more effectively block heat spreading between the battery cells 1210. However, the size of the heat blocking member 1230 is not limited thereto, and may be configured to be smaller than that of the cell body portion 1213 (in FIG. 5) of the battery cell 1210 if desired.

The extension portion 1232 of the heat blocking member 1230 may extend in a direction from the heat blocking body portion 1231 toward the bus bar frame 1320. As described above, the extension portion 1232 may be inserted into the busbar frame 1320 and may penetrate the busbar frame 1320.

The extension portion 1232 may have a width (here, the width may refer to a length in the Y-axis direction in FIG. 6) narrower than that of the heat blocking body portion 1231. For example, as illustrated in FIG. 6, the length P2 of the extension portion 1232 in the third direction (Y-axis direction) may be smaller than the length P1 of the heat blocking body portion 1231 in the third direction (Y-axis direction). However, the width of the extension portion 1232 is not limited to the above-described example. For example, the extension portion 1232 may have the same width as that of the heat blocking body portion 1231, or may have any size in which the contact between the busbars 1310 may be prevented.

The extension portion 1232 of the heat blocking member 1230 may be inserted into the busbar frame 1320 and may be disposed between two busbars 1310 adjacent to each other. For example, as illustrated in FIG. 7, the busbar frame 1320 may have an insertion hole 1323 penetrating from one surface to the other surface, and the extension portion 1232 of the heat blocking member 1230 may be inserted into the insertion hole 1323. The extension portion 1232 may be inserted into the insertion hole 1323 and may completely penetrate the busbar frame 1320.

The extension portion 1232 of the heat blocking member 1230 may further protrude in a direction toward the housing 1100 (in FIG. 2) rather than the surface of the busbar 1310. For example, as illustrated in FIG. 7, when the distance from the surface of the busbar 1310 to the end of the extension portion 1232 is defined as d, d may have a value of 0 or more. Accordingly, a conceptual line connecting two busbars 1310 adjacent to each other with the extension portion 1232 interposed therebetween may penetrate through the extension portion 1232. Since the extension portion 1232 of the heat blocking member 1230 protrude further than the busbar 1310, the contact between the busbars 1310 may be prevented during thermal runaway.

The busbar assembly 1300 may include a first busbar assembly 1300a and a second busbar assembly 1300b disposed on both sides of the busbar assembly 1300. For example, as illustrated in FIG. 7, the first busbar frame 1320a of the first busbar assembly 1300a may cover one surface of the cell stack 1200, and the second busbar frame 1320b of the second busbar assembly 1300b may cover the other surface opposite to one surface of the cell stack 1200.

The extension portion 1232 of the heat blocking member 1230 may be inserted into at least one of the first busbar frame 1320a and the second busbar frame 1320b.

A plurality of heat blocking members 1230 may be provided, and the extension portions 1232 of the plurality of heat blocking members 1230 may be inserted into different busbar frames 1320 and may be disposed between the plurality of busbars 1310. For example, as illustrated in FIG. 7, the heat blocking member 1230 may include a first heat blocking member 1230a having an extension portion 1232a inserted into the first busbar frame 1320a and a second heat blocking member 1230b having an extension portion 1232b inserted into the second busbar frame 1320b.

The first busbar frame 1320a and the second busbar frame 1320b may be disposed to oppose each other with the cell stack 1200 interposed therebetween, and accordingly, the extension portion 1232a of the first heat blocking member 1230a and the extension portion 1232b of the second heat blocking member 1230b may extend in opposite directions.

The first heat blocking member 1230a and the second heat blocking member 1230b may be alternately stacked with one or more battery cells 1210 interposed therebetween. For example, as illustrated in FIG. 7, a plurality of first heat blocking members 1230a and a plurality of second heat blocking members 1230b may be provided and may be alternately disposed in the stacking direction (e.g., a Z-axis direction) of the battery cells 1210 in the cell stack 1200.

The lead tab 1215 of the battery cell 1210 may be electrically connected to the busbar 1310. Referring to FIG. 7, the lead tab 1215 may include a bending portion 1215a formed by bending at least a portion of the lead tab 1215. For example, the bending portion 1215a may be a portion bent in a 'U' shape among the lead tabs 1215. The bending portion 1215a may absorb impact or vibration applied to the lead tab 1215. As the bending portion 1215a is provided, damage to the lead tab 1215 due to external impact or vibration may be prevented, and the coup inc between the lead tab 1215 and the busbar may be stably maintained.

The lead tab 1215 of the battery cell 1210 may be connected to the busbar 1310 in various manners. For example, as illustrated in FIG. 7, the lead tabs 1215 of the plurality of battery cells 1210 may be connected to the busbars 1310, respectively. The lead tab 1215 may be welded to and electrically connected to the busbar 1310. To increase the contact area between the lead tab 1215 and the busbar 1310, at least a portion of the lead tab 1215 may be bent toward the busbar 1310.

The plurality of lead tabs 1215 may overlap and may be connected to the busbar 1310. For example, as illustrated in FIG. 8, the lead tabs 1215 having the same polarity may overlap and may be connected to the same busbar 1310. That is, the lead tabs 1215 of the same polarity may be bent and aligned with the same busbar 1310, and may be connected to each other by welding. In this case, welding quality may not be uniform due to overlapping of the lead tabs 1215, a plurality of welding points may be determined if desired. For example, when three lead tabs 1215 overlap and are connected to a single busbar 1310 as illustrated in FIG. 8, a first welding point may be determined to be a portion in which the entirety of three lead tabs 1215 overlap, and a second welding point may be determined to be a portion in which any two lead tabs 1215 overlap. The plurality of lead tabs 1215 may be effectively connected to the busbar 1310 as above.

A plurality of battery cells 1210 disposed between the first heat blocking member 1230a and the second heat blocking member 1230b may be stacked in the same polarity direction and may be connected to each other in parallel. However, the specific connection relationship of the battery cells 1210 is not limited thereto, and the battery cells 1210 may be connected in various manners, including being disposed in series and parallel, if desired.

Another heat blocking member 1230 may include a plurality of extension portions. For example, at least one of the plurality of heat blocking members 1230 included in the busbar assembly 1300 may include a plurality of extension portions extending in different directions. Accordingly, the extension portions of one of the heat blocking members 1230 may support the busbars 1310 disposed on different busbar frames 1320a and 1320b, respectively. Hereinafter, a battery module including a heat blocking member 1230 having a plurality of extension portions will be described with reference to FIGS. 9 to 12.

Figure 9:
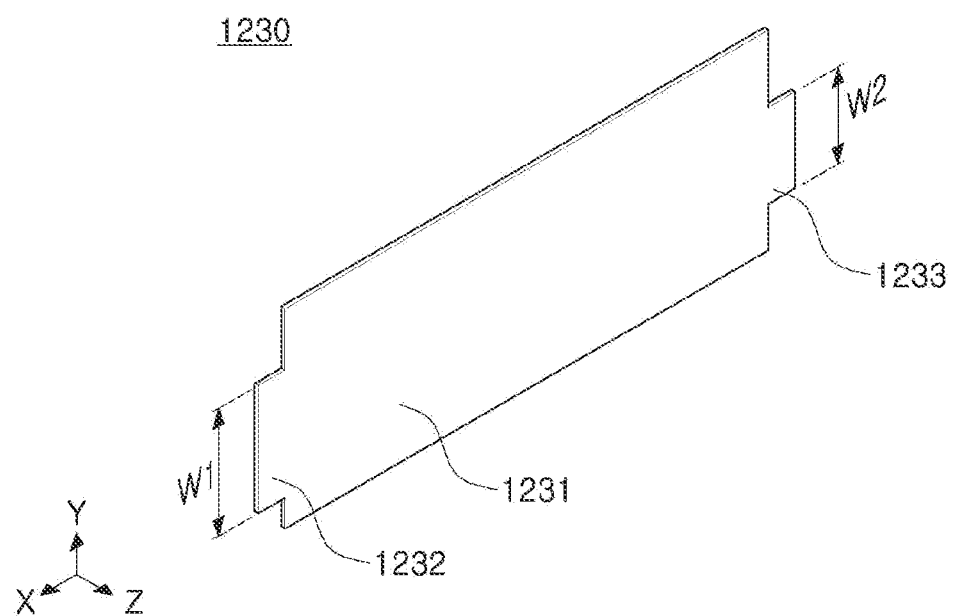
FIG. 9 is a plan diagram illustrating a plurality of extension portions according to an example embodiment of the present disclosure.
Figure 10:
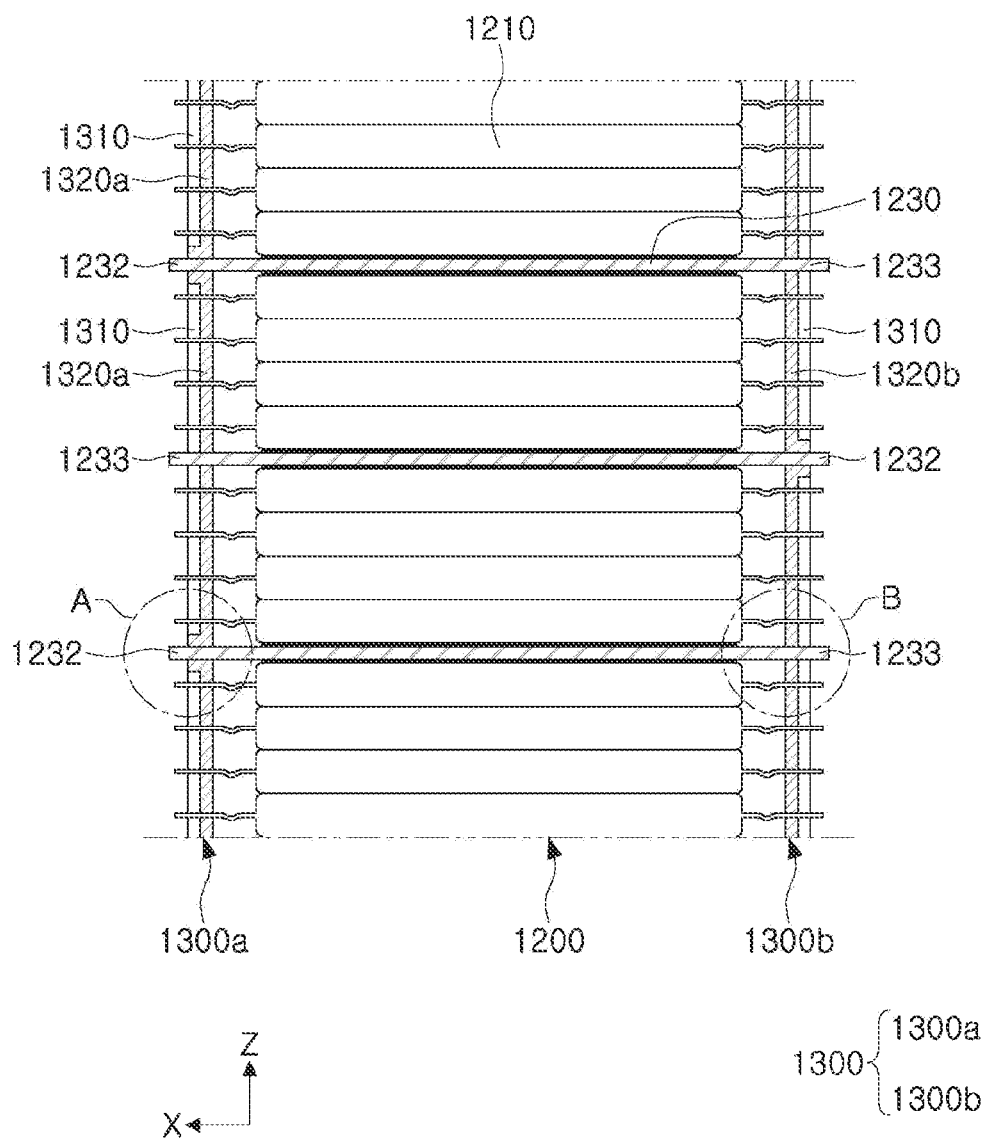
FIG. 10 is a cross-sectional diagram illustrating a cell stack and a busbar assembly to which a heat blocking member including a plurality of extension portions is applied according to an example embodiment of the present disclosure.
Figure 11:
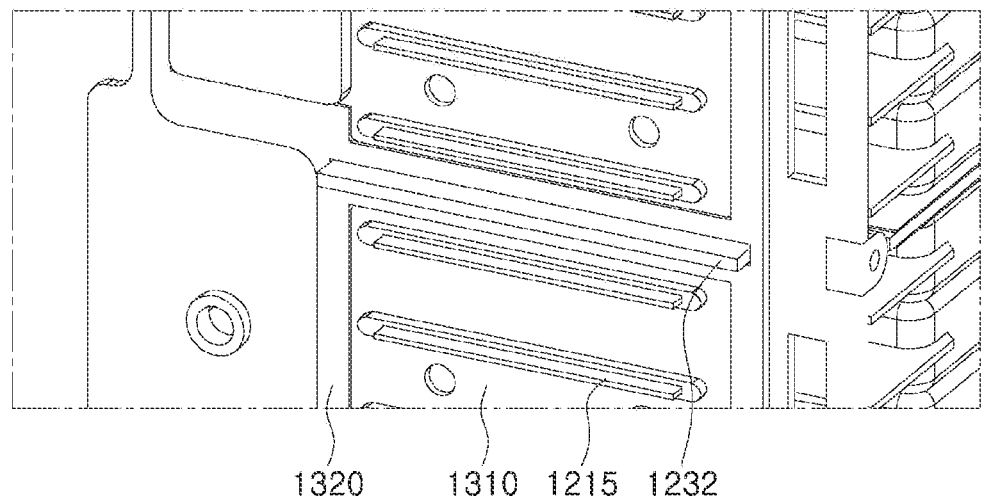
FIG. 11 is a diagram illustrating portion A in FIG. 10, diagrammed at a different angle, according to an example embodiment of the present disclosure.
Figure 12:
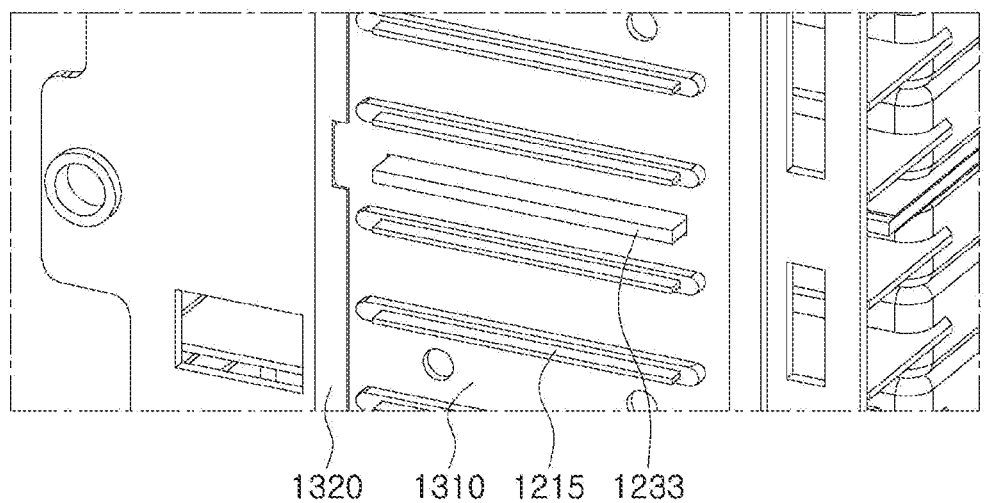
FIG. 12 is a diagram illustrating portion B in FIG. 10, diagrammed at a different angle, according to an example embodiment of the present disclosure.

FIG. 9 is a plan diagram illustrating a plurality of extension portions 1232 and 1233 according to an example embodiment. FIG. 10 is a cross-sectional diagram illustrating a cell stack 1200 and a busbar assembly 1300 to which a heat blocking member 1230 including a plurality of extension portions 1232 and 1233 are applied according to an example embodiment. FIG. 11 is a diagram illustrating portion A in FIG. 10, diagrammed at a different angle, according to an example embodiment, and FIG. 12 is a diagram illustrating portion B in FIG. 10, diagrammed at a different angle, according to an example embodiment. The heat blocking member 1230, the battery cell 1210, and the battery module including the same described with reference to FIGS. 9 to 12 may be the same as the heat blocking member 1230, the battery cell 1210, and the battery module 1000 including the same, and the plurality of extension portions 1232 and 1233 may be further included in the battery module. Accordingly, a description overlapping FIGS. 1 to 9 will not be provided.

The heat blocking member 1230 may include plurality of extension portions 1232 and 1233. For example, as illustrated in FIG. 9, the heat blocking member 1230 may include a first extension portion 1232 and a second extension portion 1233 extending from the heat blocking body portion 1231 in different directions.

The first extension portion 1232 may be disposed between the plurality of busbars 1310, and the second extension portion 1233 may be inserted into one of the plurality of busbars 1310

The first extension portion 1232 may be disposed between any two busbars 1310 adjacent to each other. For example, as illustrated in FIG. 11, the first extension portion 1232 may be inserted into the busbar frame 1320, and may be disposed between two busbars 1310 disposed side by side in the stacking direction of the battery cells 1210. The first extension portion 1232 described herein may be configured the same as the extension portion 1232 described above with reference to FIGS. 1 to 9. Accordingly, the descriptions of the extension portion 1232 in FIGS. 1 to 9 may be applied to the description of the first extension portion 1232.

The second extension portion 1233 may be inserted into at least one busbar 1310 among the plurality of busbars 1310. For example, as illustrated in FIG. 10, the second extension portion 1233 may be inserted into the busbar 1310 opposing the heat blocking member 1230 in the second direction (X-axis direction).

The second extension portion 1233 may be provided to penetrate through at least one busbar 1310 among the plurality of busbars 1310. For example, as illustrated in FIG. 10 or 12, the second extension portion 1233 may be disposed on the second busbar frame 1320b and may penetrate the busbar 1310 opposing the heat blocking member 1230 in the second direction. The busbar 1310 into which the second extension portion 1233 is inserted may further include an insertion hole into which the second extension portion 1233 is inserted.

As such, the second extension portion 1233 may be inserted into the at least one busbar 1310 such that the busbar 1310 may be prevented from moving down during thermal runaway. That is, even when the busbar frame 1320 is deformed by high-temperature thermal energy, the busbar 1310 into which the second extension portion 1233 is inserted may be supported by the second extension portion 1233 and the risk of being short-circuited with the other busbar 1310 adjacent thereto may be reduced.

Even when at least one busbar 1310 is penetrated by the second extension portion 1233, the function of the busbar 1310 (e.g., electrically connecting the battery cells 1210 to each other) may still be performed. For example, when the second extension portion 1233 of the heat blocking member 1230 is inserted into the at least one busbar 1310, the busbar 1310 may electrically connect the plurality of the battery cells 1210 adjacent to each other with the heat blocking member 1230 interposed therebetween to each other. To this end, the second extension portion 1233 inserted into the busbar 1310 may be configured to have a width narrower than the width (here, the width may be a length in a direction, perpendicular to both the X-axis and the Z-axis in FIG. 10) of the busbar 1310.

The width of the second extension portion 1233 may be narrower than the width of the first extension portion 1232 not inserted into the busbar 1310. For example, as illustrated in FIG. 9, the length W2 of the second extension portion 1233 in the third direction (Y-axis direction) may be configured to be smaller than the length W1 of the first extension portion 1232 in the third direction (Y-axis direction). However, the sizes of the first extension portion 1232 and the second extension portion 1233 are not limited to the examples described above. For example, the first extension portion 1232 and the second extension portion 1233 may be configured to have the same width.

The first extension portion 1232 and the second extension portion 1233 may include a material having at least one of flame retardancy, heat resistance, heat insulation, and insulation properties. For example, the first extension portion 1232 and the second extension portion 1233 may include at least one of mica, silicate, graphite, alumina, ceramic wool, or aerogel similarly to the heat blocking body portion 1231. Accordingly, deformation of the structure and shape of the first extension portion 1232 and the second extension portion 1233 may be reduced even when heat of 600 degrees Celsius or higher is applied.

A portion of the busbar 1310 disposed on the first busbar assembly 1300a and a portion of the busbar 1310 disposed on the second busbar assembly 1300b may be disposed to oppose each other in the second direction (e.g., the X-axis). For example, when a positive lead tab of one battery cell 1210 is connected to the first busbar assembly 1300a and the negative lead tab of one battery cell 1210 is connected to the second busbar assembly 1300b, a portion of the busbar of the first busbar assembly 1300a may oppose a portion of the busbar of the second busbar assembly 1300b in the second direction (X-axis direction). In this case, one of the heat blocking members 1230 the other heat blocking member 1230 adjacent thereto may be stacked to be directed in different directions. For example, when one of the heat blocking members 1230 is disposed such that the first extension portion 1232 is inserted into the first busbar assembly 1300a, the other heat blocking member 1230 adjacent thereto may be disposed such that the second extension portion 1233 may be inserted into the first busbar assembly 1300a. That is, as illustrated in FIG. 10, the plurality of heat blocking members 1230 may be stacked such that the first extension portion 1232 and the second extension portion 1233 may be alternately inserted into the first busbar assembly 1300a.

The heat blocking member 1230 may include the plurality of extension portions 1232 and 1233 inserted into different busbar assemblies 1300, such that the busbar assembly 1300 may be prevented from structurally collapsing during thermal runaway.

The busbar frame 1320 may further include a portion covering the extension portion of the heat blocking member 1230. Hereinafter, a battery module including such a busbar frame 1320 will be described with reference to FIG. 13.

Figure 13:
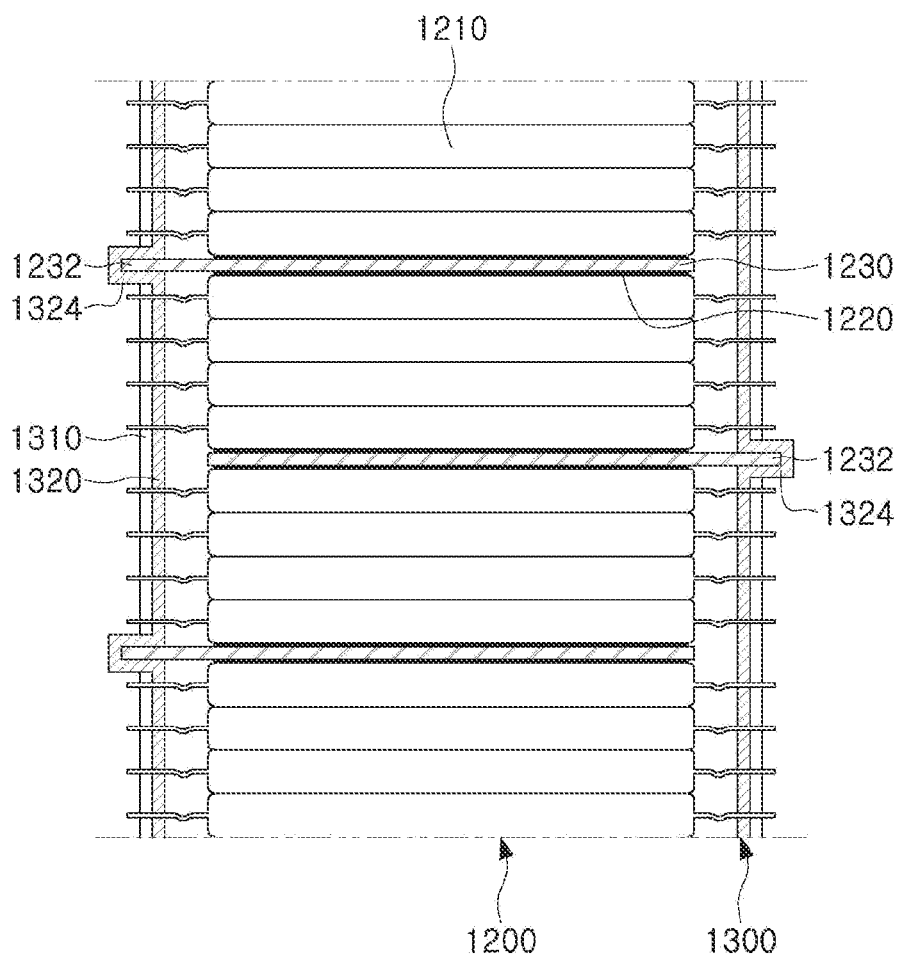
FIG. 13 is a cross-sectional diagram illustrating the example of combining a cell stack and a busbar assembly according to an example embodiment of the present disclosure.

FIG. 13 is a cross-sectional diagram illustrating the example of combining a cell stack 1200 and a busbar assembly 1300. The heat blocking member 1230, the battery cell 1210, and the battery module including the same described with reference to FIG. 13 may be the same as the heat blocking member 1230, the battery cell 1210, and the battery module including the same described with reference to FIGS. 1 to 12, and the busbar frame 1320 covering the extension portion 1232 of the heat blocking member 1230 may be further included in the battery module. Accordingly, a description overlapping with FIGS. 1 to 12 will not be provided.

The busbar frame 1320 may further include a cap 1324 covering the extension portion 1232 of the heat blocking member 1230. For example, as illustrated in FIG. 13, the busbar frame 1320 may further include a cap 1324 surrounding the end of the extension portion 1232 of the heat blocking member 1230. The cap 1324 may be provided as a separate member and may be coupled to the busbar frame 1320, or may be integrated with the busbar frame 1320 through a process such as injection molding. The cap 1324 may surround the extension portion 1232 of the heat blocking member 1230, may protect the extension portion 1232 from external impact, and may prevent foreign substances from entering the cell stack 1200 through the insertion hole of the busbar frame 1320 (in FIG. 4).

FIG. 13 illustrates a shape in which the extension portion 1232 of the heat blocking member 1230 is inserted into one of the busbar frames 1320, but the shape of the battery module including the cap 1324 is not limited thereto. For example, the heat blocking member 1230 may include a plurality of extension portions 1232 and 1233 (in FIG. 9) inserted into different busbar frames 1320, and each busbar frame 1320 may include a cap 1324 covering the plurality of extension portions 1232 and 1233 (in FIG. 9).

A plurality of battery modules may be connected to each other and may form a battery pack. Hereinafter, a battery pack 100 including a plurality of battery modules 1000 will be described with reference to FIG. 14.

Figure 14:
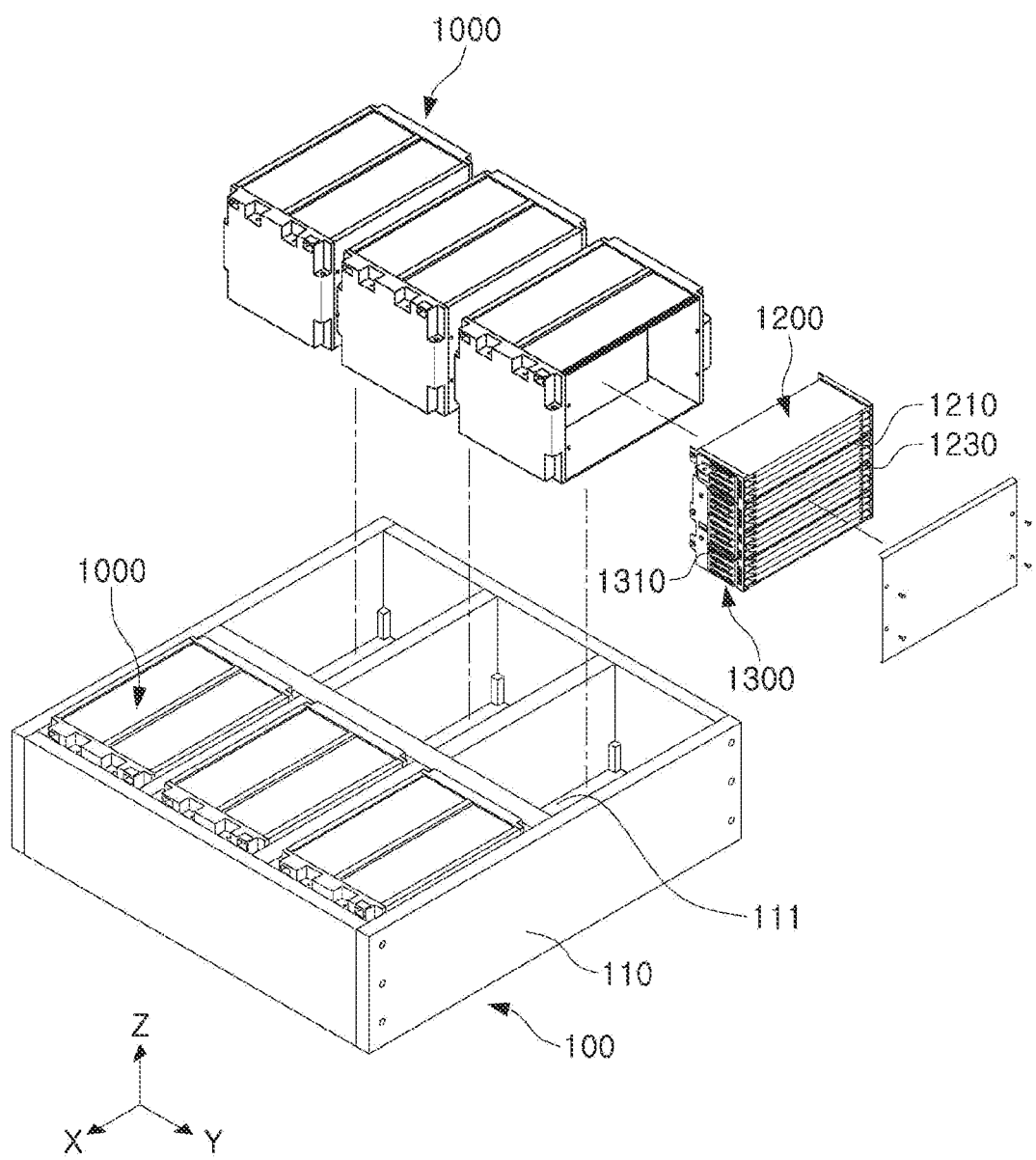
FIG. 14 is an exploded perspective diagram illustrating a battery pack according to an example embodiment of the present disclosure.

FIG. 14 is an exploded perspective diagram illustrating a battery pack 100. Since the battery module 1000 described with reference to FIG. 14 may be the same as the battery module 1000 described with reference to FIGS. 1 to 13, the overlapping description will not be provided.

The battery pack 100 may include a pack housing 110 having an internal space and one or more battery modules 1000 accommodated in the pack housing 110. Although not illustrated in FIG. 14, the battery pack 100 may further include a cover (not illustrated) covering the upper portion of the battery module 1000 and closing the internal space of the battery pack 100.

The battery pack 100 may include at least one battery module 1000. For example, as illustrated in FIG. 14, at least one battery module 1000 may be seated on the lower frame 111 of the pack housing 110.

When a plurality of battery modules 1000 are disposed, at least a portion of the battery modules 1000 may be disposed in a direction parallel to the lower frame 111 (e.g., X-axis or Y-axis direction). Alternatively, at least a portion of the battery modules 1000 may be stacked in a direction (e.g., Z-axis direction) perpendicular to the lower frame 111.

At least one battery module 1000 included in the battery pack 100 may include a cell stack 1200 in which battery cells 1210 are stacked in a first direction (e.g., a Z-axis direction). Here, the first direction (Z-axis direction) may be a direction, perpendicular to the lower frame 111 of the battery pack 100. The first direction (Z-axis direction) may be parallel to the direction of gravity. However, the example illustrated in FIG. 14 is merely an example, and a combination of the cell stack 1200 and the busbar assembly 1300 may be directly accommodated in the pack housing 110 in the battery pack 100.

At least one battery module 1000 included in the battery pack 100 may include a heat blocking member 1230 having an extension portion 1232 and 1233 (in FIGS. 2 to 13), such that an electrical short circuit between the busbars 1310 may be prevented during thermal runaway of the battery cell 1210. Therefore, using the battery module 1000 and the battery pack 100, heat spreading or chain ignition between the battery cells 1210 due to an electrical short circuit of the busbars 1310 may be prevented, and structural and electrical stability of the battery module 1000 and the entire battery pack 100 may improve.

According to the aforementioned example embodiments, a battery module in which at least a portion of the heat blocking member is inserted into the busbar frame and which may stably maintain the distance between the busbars during thermal runaway in the battery module may be implemented.

Also, the battery module may include a heat blocking member formed of a material having a melting point higher than that of the busbar frame, such that, even when a high-temperature, high-pressure gas or flame is generated in the battery module, the busbar assembly may be prevented from structurally collapsing.

Also, even when the busbar frame is structurally collapsed, the distance between the busbars may be properly maintained, thereby preventing an electrical short between the busbars.

Also, in the battery module, at least a portion of the heat blocking member may be disposed between busbars adjacent to each other such that the busbars may be physically prevented from being in contact with each other.

An electrical short circuit between busbars may be prevented during thermal runaway of the battery module, thereby preventing electrical and structural collapse of the battery module and chain ignition of battery cells.

While the example embodiments have been illustrated and described above, it will be apparent to those skilled in the art that modifications and variations could be made without departing from the scope of the present disclosure as defined by the appended claims. For example, the example embodiments described above with reference to the battery module 1000 may be applied to a battery pack in which the battery cells 1210 are directly accommodated in the pack housing without the module frame 1110 of the battery module 1000. In this case, at least a portion of the extension portion 1232 of the heat blocking member 1230 may be inserted into the pack housing and may prevent an electrical short circuit between the busbars.

What is claimed is:

1. A battery module, comprising:
a housing having an internal space;
a cell stack accommodated in the internal space and including a plurality of battery cells and a plurality of heat blocking members disposed between the plurality of battery cells;
a busbar assembly including a busbar frame facing at least one side surface of the cell stack, and a plurality of busbars coupled to the busbar frame and electrically connected to the plurality of battery cells,
wherein at least one of the plurality of heat blocking members includes an extension portion which penetrates through the busbar frame and extends outwardly beyond both the busbar frame and the busbar assembly to electrically isolate the plurality of busbars from each other.

2. The battery module of claim 1, wherein the extension portion of the heat blocking member includes a material having a melting point higher than a melting point of a material that constitutes at least part of the busbar frame.

3. The battery module of claim 2, wherein a material of the extension portion includes mica, ceramic wool, aerogel, or a combination of two or more of mica, ceramic wool, and aerogel.

4. The battery module of claim 1, wherein the extension portion is disposed between two busbars adjacent to each other among the plurality of busbars and protrudes in a direction toward the housing.

5. The battery module of claim 1,
wherein one surface of the busbar frame is disposed to oppose the cell stack, and
wherein the plurality of busbars are disposed on the other surface opposite to the one surface of the busbar frame.

6. The battery module of claim 5,
wherein the busbar frame includes an insertion hole penetrating from the one surface to the other surface, and
wherein the extension portions are inserted into the insertion holes and penetrate through the busbar frame.

7. The battery module of claim 1, wherein at least one of the plurality of battery cells includes:
a cell body portion including an electrode assembly and a pouch surrounding the electrode assembly; and
a plurality of lead tabs connected to the electrode assembly and exposed externally of the pouch.

8. The battery module of claim 7,
wherein the heat blocking member includes:
a heat blocking body portion disposed to oppose the cell body portion in a first direction; and
the extension portion extending from the heat blocking body portion in a second direction perpendicular to the first direction, and
wherein a length of the extension portion in a third direction perpendicular to both the first direction and the second direction is equal to or smaller than a length of the heat blocking body portion in the third direction.

9. The battery module of claim 8, wherein a length of the heat blocking body portion in the second direction and a length in the third direction are equal to or greater than a length of the cell body portion in the second direction and a length in the third direction, respectively.

10. The battery module of claim 1,
wherein the housing includes a lower plate on which the cell stack is seated, and
wherein the plurality of battery cells and the plurality of heat blocking members included in the cell stack are stacked in a first direction perpendicular to the lower plate.

11. The battery module of claim 1,
wherein the busbar frame includes a first busbar frame and a second busbar frame disposed on opposing sides of the cell stack, respectively, and
wherein the plurality of heat blocking members include one or more first heat blocking members having an extension portion inserted into the first busbar frame and one or more second heat blocking members having an extension portion inserted into the second busbar frame.

12. The battery module of claim 11, wherein the extension portion of the one or more first heat blocking members and the extension portion of the one or more second heat blocking members extend in opposite directions.

13. The battery module of claim 11, wherein the one or more first heat blocking members and the one or more second heat blocking members are disposed to oppose each other with one or more of the plurality of battery cells interposed therebetween, and are alternately disposed in a stacking direction of the cell stack.

14. The battery module of claim 1,
wherein the busbar frame includes a first busbar frame and a second busbar frame disposed on both sides of the cell stack, respectively, and
wherein at least one of the plurality of heat blocking members includes a first extension portion inserted into the first busbar frame and a second extension portion inserted into the second busbar frame.

15. The battery module of claim 14,
wherein the first extension portion is disposed between two busbars adjacent to each other among a plurality of busbars coupled to the first busbar frame, and
wherein the second extension portion penetrates through one of the plurality of busbars coupled to the second busbar frame.

16. The battery module of claim 1, wherein the busbar frame further includes a cap surrounding an end of the extension portion.

17. The battery module of claim 1,
wherein at least one of the plurality of battery cells includes a lead tab electrically connected to at least one of the plurality of busbars, and
wherein at least a portion of the lead tab is bent to oppose a surface of at least one of the plurality of busbars.

18. A battery module, comprising:
a housing having an internal space;
one or more cell stacks accommodated in the internal space, and including a plurality of battery cells and a plurality of heat blocking members stacked therein in a first direction;
a busbar frame disposed on at least one side of the one or more cell stacks; and
a plurality of busbars disposed on the busbar frame and electrically connected to at least a portion of the plurality of battery cells,
wherein the plurality of busbars include:
a first busbar disposed to oppose the cell stack in a second direction; and
a second busbar disposed adjacent to the first busbar in the first direction, and
wherein at least one of the plurality of heat blocking members includes an extension portion extending in the second direction to penetrate through the busbar frame, the extension portion extends outwardly beyond both the busbar frame and the plurality of busbars, and the extension portion is at least one of a) disposed between the first busbar and the second busbar and b) penetrating through at least one of the first busbar or the second busbar to electrically isolate the plurality of busbars from each other.

19. The battery module of claim 18,
wherein the one or more cell stacks include a first cell stack and a second cell stack arranged side by side in a third direction perpendicular to both the first direction and the second direction, and
wherein the housing includes a barrier wall disposed between the first cell stack and the second cell stack and partitioning the internal space.

20. A battery pack including a plurality of battery modules in claim 18.

* * * * *